United States Patent
Fu et al.

(10) Patent No.: US 9,358,173 B2
(45) Date of Patent: Jun. 7, 2016

(54) REHABILITATION AND TRAINING APPARATUS AND METHOD OF CONTROLLING THE SAME

(71) Applicant: NATIONAL TAIWAN UNIVERSITY, Taipei (TW)

(72) Inventors: Li-Chen Fu, Taipei (TW); Wei-Wen Wang, Shuangsi Township (TW); Cheng-Chang Ho, Taipei (TW); Yen-Yu Chou, Yonghe (TW)

(73) Assignee: NATIONAL TAIWAN UNIVERSITY (TW)

( * ) Notice: Subject to any disclaimer, the term of this patent is extended or adjusted under 35 U.S.C. 154(b) by 839 days.

(21) Appl. No.: 13/667,028

(22) Filed: Nov. 2, 2012

(65) Prior Publication Data

US 2013/0060171 A1 Mar. 7, 2013

Related U.S. Application Data

(63) Continuation-in-part of application No. 12/166,656, filed on Jul. 2, 2008, now abandoned.

(30) Foreign Application Priority Data

May 9, 2008 (TW) .............................. 97117291 A (51) Int. Cl.
*A61H 1/02* (2006.01)
*A61H 1/00* (2006.01)
*B25J 9/00* (2006.01)

(52) U.S. Cl.
CPC ................ *A61H 1/0274* (2013.01); *A61H 1/00* (2013.01); *A61H 1/02* (2013.01); *A61H 1/0277* (2013.01);*A61H 1/0281* (2013.01); *A61H 1/0285* (2013.01); *A61H 2201/1635* (2013.01); *A61H 2201/5007* (2013.01); *A61H 2201/5035* (2013.01); *A61H 2201/5061* (2013.01); *A61H 2201/5064* (2013.01); *A61H 2203/0431* (2013.01); *A61H 2205/06* (2013.01); *B25J 9/0006* (2013.01)

(58) Field of Classification Search
CPC .... B25J 9/0006; Y10S 901/02; Y10S 901/18; Y10S 901/20; A61G 5/00; A61B 5/6894; A61F 4/00; A61H 1/00; A61H 1/001; A61H 1/02; A61H 2001/0203; A61H 2001/0207; A61H 2001/0211; A61H 1/0214; A61H 1/0237; A61H 1/024; A61H 1/0244; A61H 2201/16; A61H 2201/1628; A61H 2201/163; A61H 2201/1633; A61H 2201/1657; A61H 2201/1666; A61H 2201/50; A61H 2201/5023; A61H 2201/5058; A61H 2201/5061; A61H 2201/5064; A61H 2205/00; A61H 2205/10; A61H 1/0262; A61H 1/0274; A61H 1/0277; A61H 1/0281; A61H 1/0285; A61H 1/0288; A61H 3/04; A61H 2201/12; A61H 2201/1207; A61H 2201/123; A61H 2201/1261; A61H 2201/1635; A61H 2205/06
USPC ............. 623/27–65; 901/1; 601/5, 23, 24, 26, 601/33, 40, 84, 87, 89, 90, 93, 97, 98, 101
See application file for complete search history.

(56) References Cited

U.S. PATENT DOCUMENTS

| | | | | |
|---|---|---|---|---|
| 3,449,769 A * | 6/1969 | Mizen | ....................... | A61F 2/54 601/23 |
| 4,180,870 A * | 1/1980 | Radulovic | .............. | B25J 9/0006 601/33 |
| 4,669,451 A * | 6/1987 | Blauth | .................... | A61F 5/013 482/901 |
| 4,936,299 A * | 6/1990 | Erlandson | ........... | A63B 69/0053 482/9 |
| 5,179,939 A * | 1/1993 | Donovan | .............. | A61H 1/0281 482/4 |
| 5,417,643 A * | 5/1995 | Taylor | .................. | A61H 1/0274 601/24 |
| 5,951,499 A * | 9/1999 | Saringer | .............. | A61H 1/0274 601/33 |
| 6,301,526 B1 * | 10/2001 | Kim | ....................... | B25J 9/0006 600/1 |
| 6,743,187 B2 * | 6/2004 | Solomon | .................. | A61H 1/02 600/587 |

| | | | |
|---|---|---|---|
| 2003/0028130 A1 | 2/2003 | Wunderly et al. | |
| 2003/0115954 A1* | 6/2003 | Zemlyakov | A61B 5/022 73/379.01 |
| 2003/0223844 A1* | 12/2003 | Schiele | A61H 1/0274 414/5 |
| 2004/0073143 A1* | 4/2004 | Bonutti | A61F 5/013 601/5 |
| 2004/0082885 A1* | 4/2004 | Culhane | A61H 1/0277 601/5 |
| 2006/0079817 A1* | 4/2006 | Dewald | A61H 1/02 601/5 |
| 2006/0106326 A1* | 5/2006 | Krebs | A61H 1/0274 601/40 |
| 2007/0225620 A1* | 9/2007 | Carignan | A61H 1/0281 601/5 |
| 2007/0255190 A1* | 11/2007 | Sadok | B25J 9/0006 602/16 |
| 2008/0004550 A1 | 1/2008 | Einav et al. | |
| 2008/0249438 A1* | 10/2008 | Agrawal | A61H 1/0237 601/35 |
| 2010/0016766 A1 | 1/2010 | Zhang et al. | |

FOREIGN PATENT DOCUMENTS

| | | | | |
|---|---|---|---|---|
| FR | 2861983 A1 * | 5/2005 | | B25J 9/0006 |
| IT | WO 2004058458 A1 * | 7/2004 | | B25J 9/0006 |

OTHER PUBLICATIONS

Machine translation, "English Translation for FR 2861983", Patent Translate Powered by EPO and Google, translation captured on Mar. 2, 2016.*

Y. F. Li and X. B. Chen; On the Dynamic Behavior of a Force/Torque Sensor for Robots, IEEE Transactions on Instrumentation and Measurement, vol. 47, No. 1, Feb. 1998; pp. 304-308.

* cited by examiner

*Primary Examiner* — Justine Yu
*Assistant Examiner* — Tu Vo
(74) *Attorney, Agent, or Firm* — Schmeiser, Olsen & Watts, LLP (57) ABSTRACT

A rehabilitation and training apparatus is built based on the empirical law by introducing physical therapists' experiences into the apparatus to simulate therapy with hands in the course of rehabilitation. The apparatus includes a multi-axis robotic arm having first to eighth arm segments, and a high-precision control system for controlling movements of the multi-axis robotic arm. The control system provides an active, a passive and an auxiliary mode; receives and computes information about a patient's movements and muscle force detected by potentiometers and force sensors provided in the multi-axis robotic arm; and accordingly, drives actuators to apply an aiding force or a resisting force to assist the patient in completing rehabilitation exercises. The apparatus also includes a humanized operating interface, via which a doctor or a physical therapist may obtain related rehabilitation data for assessment and adjustment of rehabilitation therapeutic courses. A method of controlling the apparatus is introduced.

17 Claims, 12 Drawing Sheets

REHABILITATION AND TRAINING APPARATUS AND METHOD OF CONTROLLING THE SAME

CROSS-REFERENCE TO RELATED APPLICATION

This application is a continuation-in-part patent application of U.S. application Ser. No. 12/166,656 filed on Jul. 2, 2008, the entire contents of which are hereby incorporated by reference for which priority is claimed under 35 U.S.C. §120.

FIELD OF TECHNOLOGY

The present invention relates to a physical therapy apparatus for passive exercising, and more particularly to an apparatus for assisting a patient in completing and repeating rehabilitation exercises to train the patient's ability to stretch or bend muscles and joints.

BACKGROUND

The limbs are the human body portions that most frequently contact with external environment, and are therefore most easily subject to injury. According to the rehabilitation medicine, limb injuries may be generally divided into three types, namely, musculoskeletal disorders, neurological disorders, and childhood disorders. For example, the Adhesive Capsulitis, also called frozen shoulder, is one type of the musculoskeletal disorders most frequently suffered by the aged and the mid-aged. The limb injuries caused by neurological disorders and childhood disorders are most frequently found among young people. And, rehabilitation after surgery for breast cancer is generally found among women. From the above analyses, it can be found that the limb injuries are distributed among all ages. Therefore, the rehabilitation therapy is particularly important when considering from this viewpoint. The main purpose of rehabilitation therapy is to enhance the therapeutic effect and effectively shorten the duration of hospitalization, and to achieve the largest possible extent of body function recovery, so that the patient may live independently without relying on others.

In the traditional rehabilitation therapy, therapy with hands is still a main approach of therapy. However, the therapy with hands is relied on the physical therapist's personal experiences, and there is no means for accurately controlling the magnitude of applied force and the turning extent of joint. Under this circumstance, the patient is possibly subject to a second time injury. Moreover, the whole therapeutic course is quite long to spiritually and physically exhaust both the physical therapist and the patient. And, there are various kinds of rehabilitation apparatuses designed for different rehabilitation exercises. However, while the patients frequently take additional time and efforts to learn how to operate the rehabilitation devices, they fail to achieve the expected rehabilitation effect through using these rehabilitation devices.

It is therefore tried by the inventor to develop a rehabilitation and training apparatus that adopts the empirical law by introducing the physical therapists' experiences into the apparatus to simulate the therapy with hands, so as to assist the patient in achieving the target of rehabilitation and integrate different rehabilitation devices into one computer-controllable apparatus. A method of controlling the apparatus is also provided.

SUMMARY

A primary object of the present invention is to provide a rehabilitation and training apparatus that is built by introducing physical therapists' experiences into the apparatus to simulate therapy with hands in the rehabilitation therapeutic courses, and integrates different types of rehabilitation devices into one unit to conveniently assist a patient in achieving the rehabilitation.

To achieve the above and other objects, the rehabilitation and training apparatus according to the present invention is used to assist a patient in doing upper or lower limb rehabilitation exercises, and includes a movable base; a position adjustment mechanism arranged on the movable base and including a vertical linear sliding rail and a horizontal linear sliding rail connected to the vertical linear sliding rail; a multi-axis robotic arm including a first arm segment connected to the vertical linear sliding rail and rotatable about a first rotational axis; a second arm segment connected to the first arm segment and rotatable about a second rotational axis; a third arm segment connected to the second arm segment and rotatable about a third rotational axis, which is parallel to the first and second rotational axes; a fourth arm segment connected to the third arm segment and rotatable about a fourth rotational axis, which is perpendicular to the first, second and third rotational axes; a fifth arm segment connected to the fourth arm segment and rotatable about a fifth rotational axis, which is perpendicular to the fourth rotational axis; a sixth arm segment connected to the fifth arm segment and rotatable about a sixth rotational axis, which is perpendicular to the fifth rotational axis; a seventh arm segment connected to the sixth arm segment and rotatable about a seventh rotational axis, which is parallel to the sixth rotational axis; and an eighth arm segment connected to the seventh arm segment; a plurality of potentiometers provided on the multi-axis robotic arm for detecting different positions of the first to eighth arm segments; a plurality of force sensors provided on the multi-axis robotic arm for detecting a force applied to at least one of the first to eighth arm segments; a plurality of actuators provided on the multi-axis robotic arm for driving the first to eighth arm segments of the multi-axis robotic arm to move; and a control system electrically connected to the potentiometers and the force sensors for receiving and computing information detected and sent by the potentiometers and force sensors, and driving the actuators based on the computed information to control the multi-axis robotic arm, and the control system being able to record and analyze the patient's rehabilitation data.

Another object of the present invention is to provide a method of controlling the above-described rehabilitation and training apparatus, so that the apparatus may best assist a patient in completing and repeating different rehabilitation exercises. The control method includes the following steps: selecting one of an active mode, a passive mode, and an auxiliary mode from the control system; selecting a magnitude of resisting force to be applied by the multi-axis robotic arm when the active mode is selected; the control system receiving information detected and sent by the potentiometers and determining a direction in which a patient moves a limb; and the control system driving the actuators to apply a reverse resisting force to train the patient's muscular strength.

The control method further includes the following steps when the passive mode is selected: selecting a desired rehabilitation exercise from the control system; the control system determining whether the multi-axis robotic arm is in an initial position corresponding to the selected rehabilitation exercise; and the multi-axis robotic arm starting performing and repeating the selected rehabilitation exercise when the multi-axis robotic arm has been returned to the initial position.

The control method further includes the following steps when the auxiliary mode is selected: selecting a desired rehabilitation exercise from the control system; the control system determining whether the multi-axis robotic arm is in an initial position corresponding to the selected rehabilitation exercise; the patient starting performing and repeating the selected rehabilitation exercise when the multi-axis robotic arm has been returned to the initial position; and the control system receiving information about a magnitude of force produced by the patient detected and sent by the force sensors and information about a direction of the force produced by the patient detected and sent by the potentiometers, and driving the actuators to apply an aiding force in the same direction as that of the force produced by the patient, so as to help the patient to complete and repeat the selected rehabilitation exercise.

With the above arrangements, the rehabilitation and training apparatus of the present invention can be used to assist a patient in performing various upper and lower limb rehabilitation exercises. More specifically, through control of the control system, the multi-axis robotic arm can be driven to perform various and complete upper and lower limb rehabilitation exercises and training, such as the abduction and adduction, the external and internal rotations, the extension and flexion, and many other movements of different areas of upper or lower limbs. Compared to prior art rehabilitation apparatus, the rehabilitation and training apparatus of the present invention and the method of controlling the same can actually introduce physical therapists' experiences into the apparatus to simulate therapy with hands in the rehabilitation therapeutic courses, and integrates different types of rehabilitation devices into one unit to conveniently assist a patient in achieving the rehabilitation.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

Figure 1:
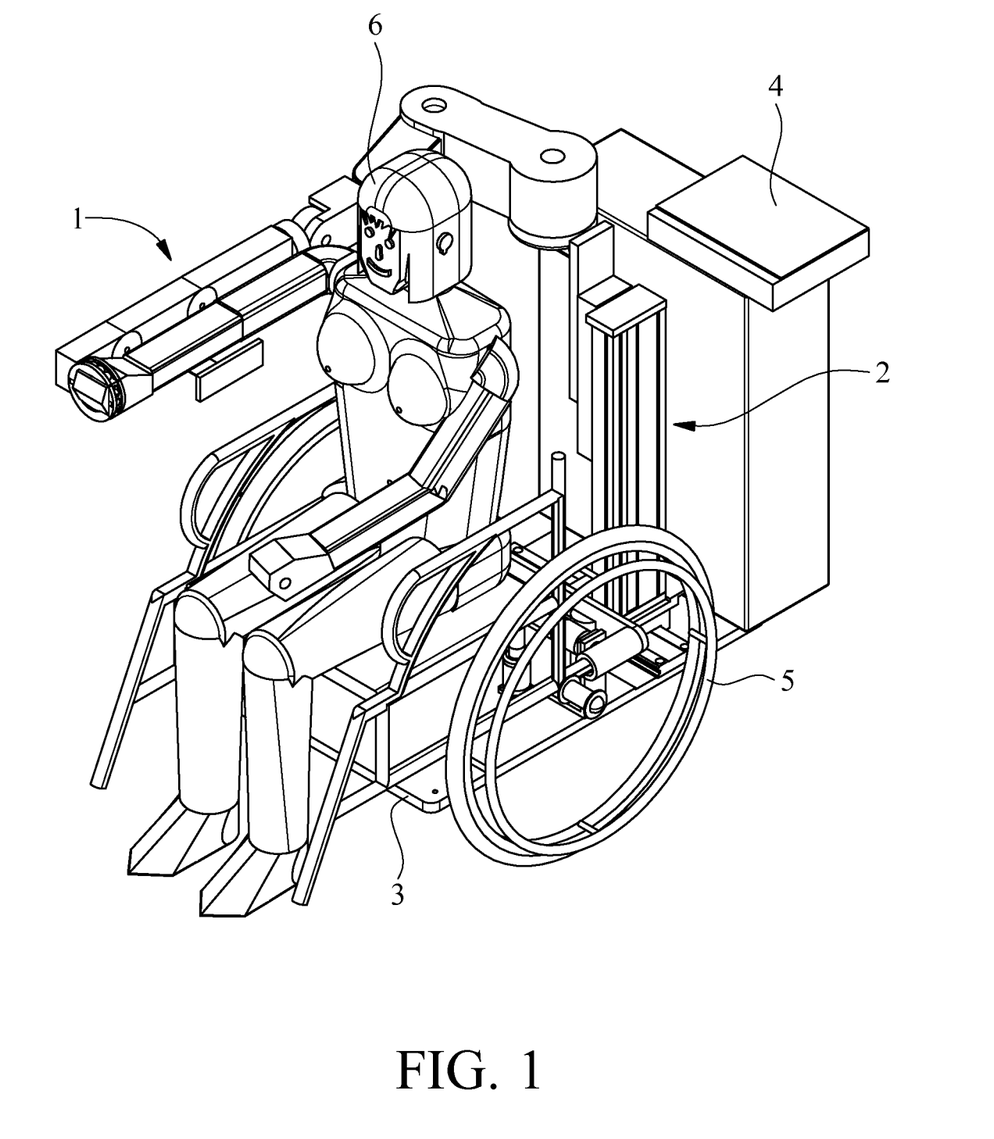
FIG. 1 is a perspective view of a rehabilitation and training apparatus according to the present invention with a patient sitting thereon.
Figure 2:
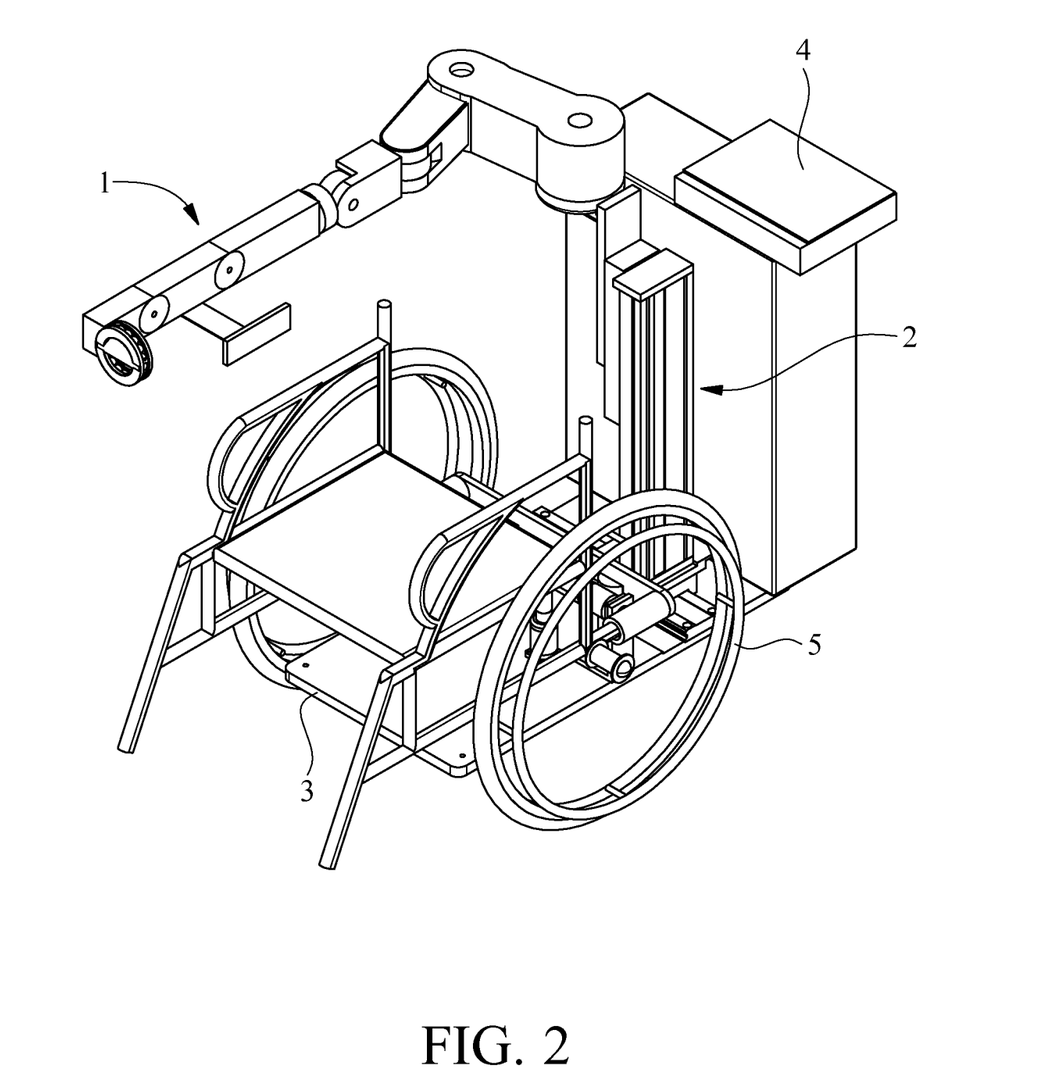
FIG. 2 is a perspective view of the rehabilitation and training apparatus of the present invention.
Figure 3:
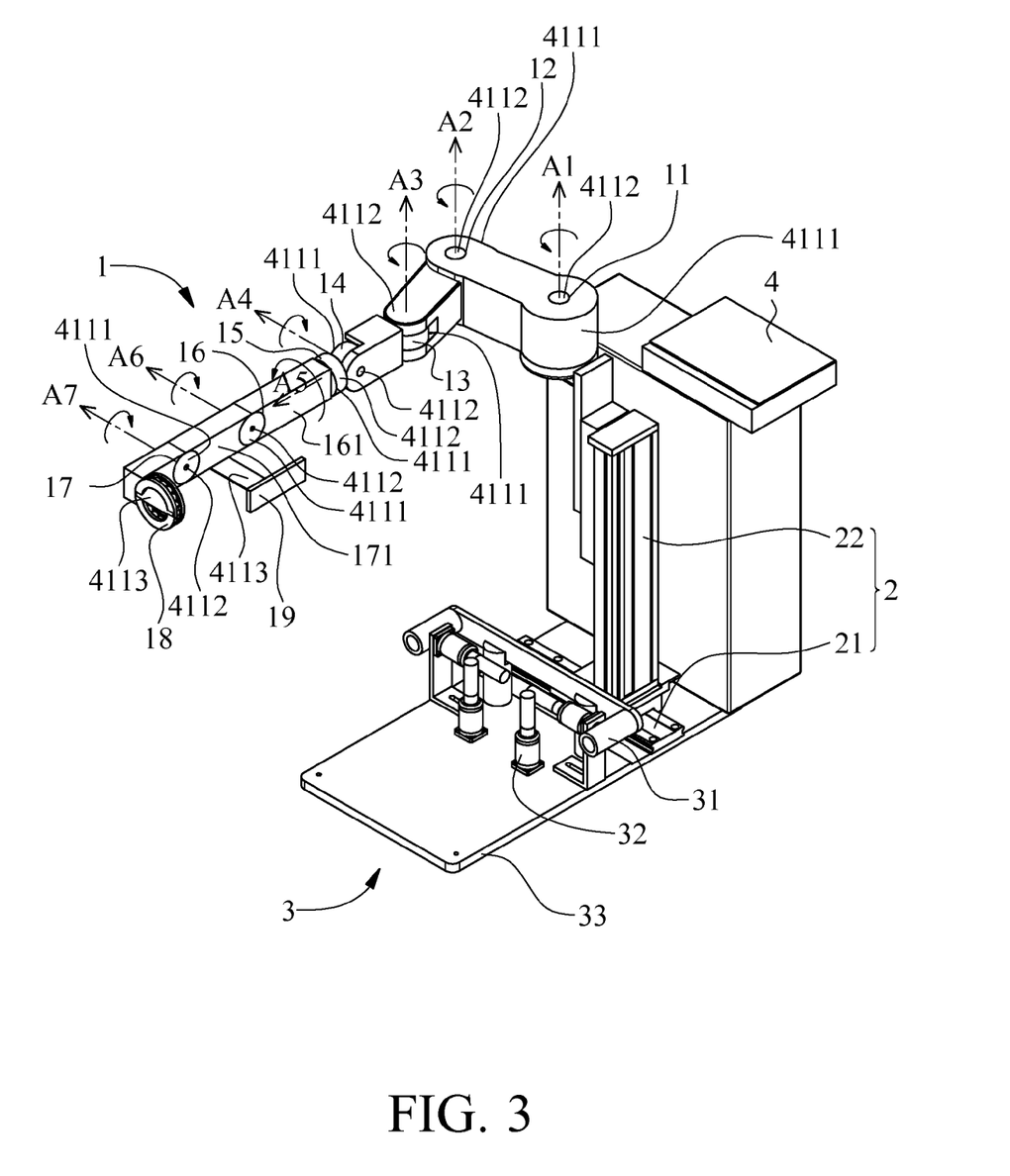
FIG. 3 is a perspective view showing a multi-axis robotic arm, a position adjusting mechanism, and a movable base included in the present invention.

Please refer to FIGS. 1 and 2 that are two perspective views of a rehabilitation and training apparatus according to the present invention with and without a patient 6 sitting thereon. As shown, the rehabilitation and training apparatus of the present invention includes a multi-axis robotic arm 1, a position adjustment mechanism 2, a movable base 3, and a control system 4. In a more preferred embodiment of the present invention, the rehabilitation and training apparatus may further include a wheelchair 5. FIG. 3 is a perspective view more clearly showing how the multi-axis robotic arm 1, the position adjustment mechanism 2, and the movable base 3 are connected to one another.

The position adjustment mechanism 2 is arranged on the movable base 3, and includes a vertical linear sliding rail 22 and a horizontal linear sliding rail 21 perpendicularly connected to the vertical linear sliding rail 22.

The multi-axis robotic arm 1 provides eight degrees of freedom, and includes total eight arm segments, namely, a first arm segment 11, a second arm segment 12, a third arm segment 13, a fourth arm segment 14, a fifth arm segment 15, a sixth arm segment 16, a seventh arm segment 17 and an eighth arm segment 18, each of which includes at least one rotatable joint and other supporting or connecting links. The first arm segment 11 is connected at an end to the vertical linear sliding rail 22 and is rotatable about a first rotational axis A1. The second arm segment 12 is connected to another end of the first arm segment 11 opposite to the vertical linear sliding rail 22 and is rotatable about a second rotational axis A2. The third arm segment 13 is connected to an end of the second arm segment 12 opposite to the first arm segment 11 and is rotatable about a third rotational axis A3. Wherein, the first rotational axis A1, the second rotational axis A2 and the third rotational axis A3 are extended parallel to one another.

The fourth arm segment 14 is connected to an end of the third arm segment 13 opposite to the second arm segment 12 and is rotatable about a fourth rotational axis A4, which is extended in a direction perpendicular to the first, second and third rotational axes A1, A2, A3. The fifth arm segment 15 is connected to an end of the fourth arm segment 14 opposite to the third arm segment 13 and is rotatable about a fifth rotational axis A5, which is extended in a direction perpendicular to the fourth rotational axis A4. The sixth arm segment 16 is connected to an end of the fifth arm segment 15 opposite to the fourth arm segment 14 and is rotatable about a sixth rotational axis A6, which is extended in a direction perpendicular to the fifth rotational axis A5. The seventh arm segment 17 is connected to an end of the sixth arm segment 16 opposite to the fifth arm segment 15 and is rotatable about a seventh rotational axis A7, which is extended in a direction parallel to the sixth rotational axis A6. The eighth arm segment 18 is connected to an end of the seventh arm segment 17 opposite to the sixth arm segment 16.

These eight arm segments are respectively provided with a potentiometer 4112 for measuring the angles at the joints thereof, a force sensor 4113 for detecting the forces applied to the arm segments, and an actuator 4111 for driving the arm segments to assist the patient 6 in moving upper or lower limb and rotating joints thereof.

The control system 4 is upright located on the movable base 3 behind the position adjustment mechanism 2, and is electrically connected to the potentiometers 4112 and the force sensors 4113 for receiving and computing information detected and sent by the potentiometers 4112 and the force sensors 4113, and driving the actuators 4111 based on the computed results, so as to control the multi-axis robotic arm 1 to move. The control system 4 also records and analyzes data showing the patient's rehabilitation conditions.

According to the illustrated embodiment, when the rehabilitation and training apparatus is used to help the patient 6 in performing upper limb rehabilitation exercises as shown in FIG. 1, the fourth arm segment 14 is located corresponding to the patient's shoulder, the fifth arm segment 15 is located corresponding to the patient's shoulder and upper arm, the sixth arm segment 16 is located corresponding to the patient's elbow, the seventh arm segment 17 is located corresponding to the patient's wrist, and the eighth arm segment 18 is located corresponding to the patient's palm. Further, the first rotational axis A1, the second rotational axis A2 and the third rotational axis A3 are extended in a vertical direction, so that the first arm segment 11, the second arm segment 12 and the third arm segment 13 are operable on the same one horizontal plane or on different horizontal planes. Through control of the first arm segment 11, the second arm segment 12 and the third arm segment 13, the fourth to the eighth arm segments 14-18 can be brought to correspond to different positions of the patient's upper limb and keep the patient's upper limb in proper position. Moreover, the first arm segment 11, the second arm segment 12 and the third arm segment 13 can be immediately actuated and adjusted for performing various rehabilitation exercises, which are described below.

According to the illustrated rehabilitation and training apparatus of the present invention, the first to eight arm segments 11-18 of the multi-axis robotic arm 1 are characterized in that they can perform various upper limb or lower limb rehabilitation exercises when at least two of the first to eighth arm segments 11-18 are coordinately actuated. Some major functions of the first to eighth arm segments 11-18 of the multi-axis robotic arm 1 during the use of the rehabilitation and training apparatus of the present invention to perform various rehabilitation exercises, and some upper limb rehabilitation exercises that can be performed through interactions between the first to eight arm segments 11-18 will now be described. Please note, the angles of different limb areas as referred to herein are measured with reference axes defined by the patient's different limb areas in a neutral position, which is at a zero-degree position.

To help the patient 6 to perform the rehabilitation exercises of shoulder horizontal abduction/adduction, first cause the third arm segment 13 to rotate about the third rotational axis A3, so that the fourth to eighth arm segments 14-18 are actuated to move the patient's arm to a horizontal position as high as the patient's shoulder, allowing the patient 6 to do the exercises of shoulder horizontal abduction and adduction.

Figure 4A:
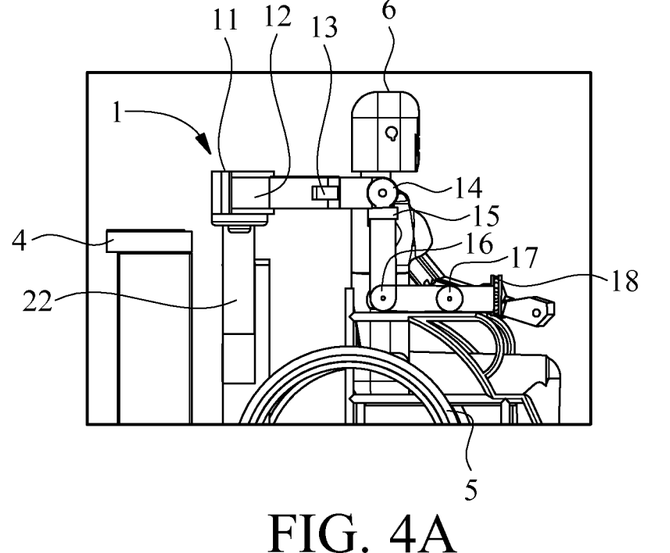
FIGS. 4A and 4B are fragmentary side view and fragmentary front 45-degree perspective view, respectively, showing a first way of using the rehabilitation and training apparatus of the present invention to help a patient in performing the rehabilitation exercise of shoulder flexion; wherein the patient's upper arm is initially at a rotation angle of zero degree and the patient's shoulder joint is initially at a zero-degree position.
Figure 4B:
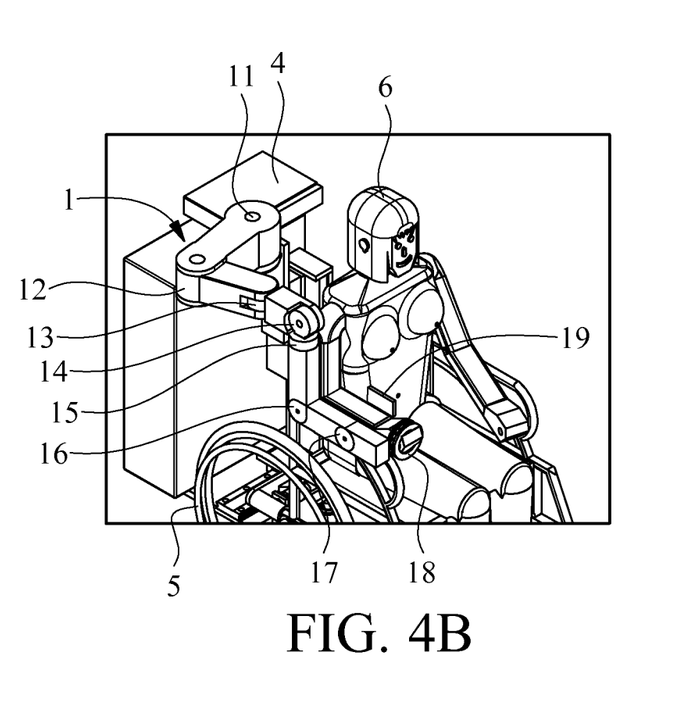
Figure 5A:
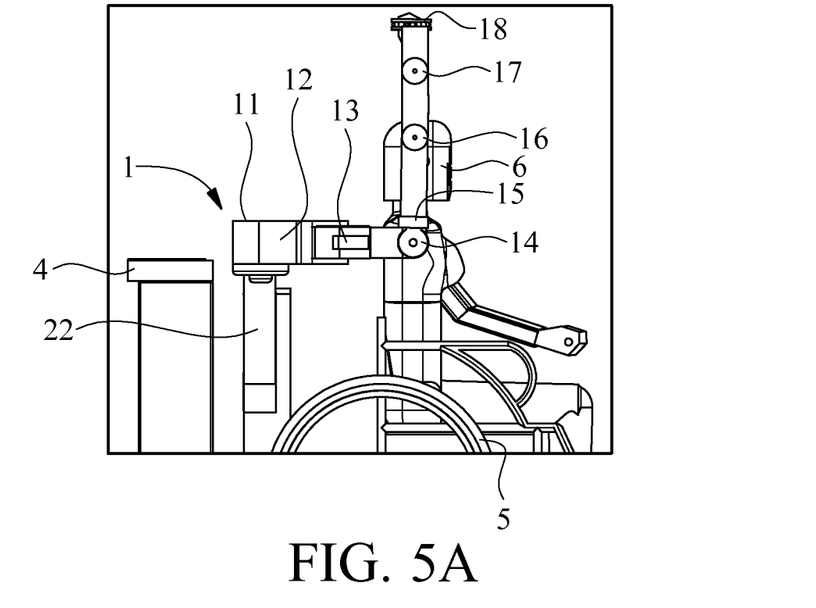
FIGS. 5A and 5B are also fragmentary side view and fragmentary front 45-degree perspective view, respectively, showing the first way of using the rehabilitation and training apparatus of the present invention to help a patient in performing the rehabilitation exercise of shoulder flexion; wherein the patient's upper arm is maintained at the rotation angle of zero degree while the patient's shoulder joint has been upward turned to a 180-degree position.
Figure 5B:
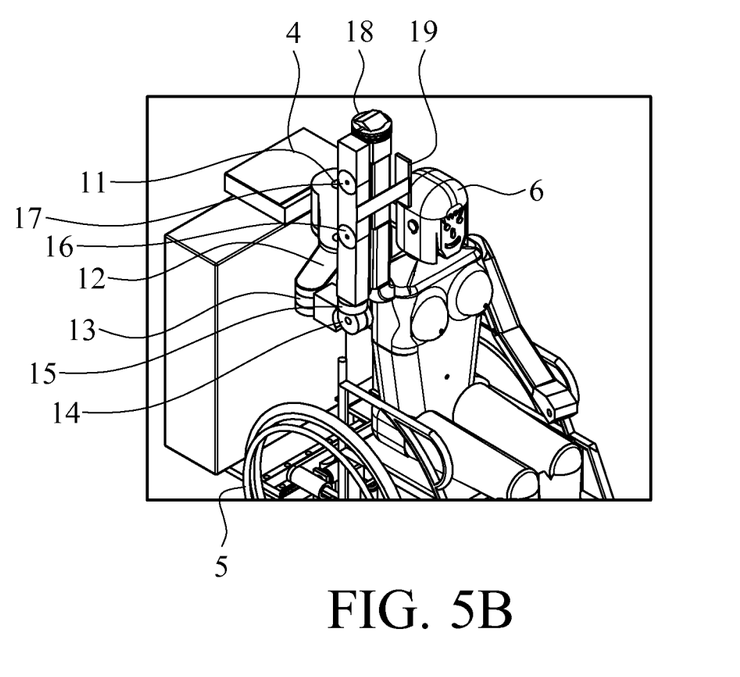
Figure 6A:
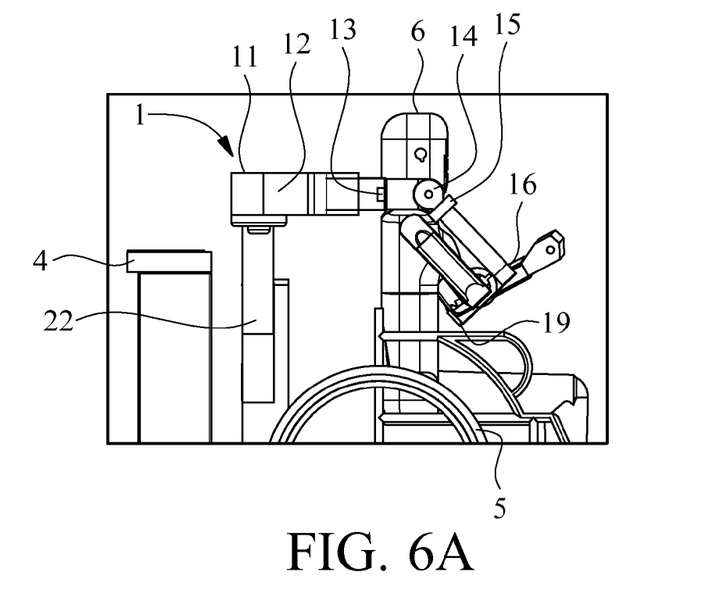
FIGS. 6A and 6B are fragmentary side view and fragmentary front 45-degree perspective view, respectively, showing a second way of using the rehabilitation and training apparatus of the present invention to help a patient in performing the rehabilitation exercise of shoulder flexion; wherein the patient's upper arm is initially at a rotation angle of 90-degree internal rotation and the patient's shoulder joint is initially at a zero-degree position.
Figure 6B:
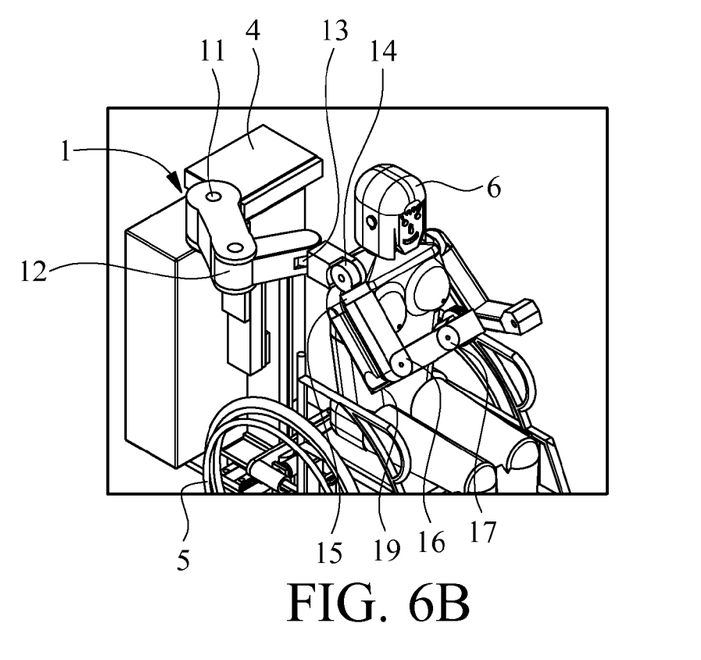
Figure 7A:
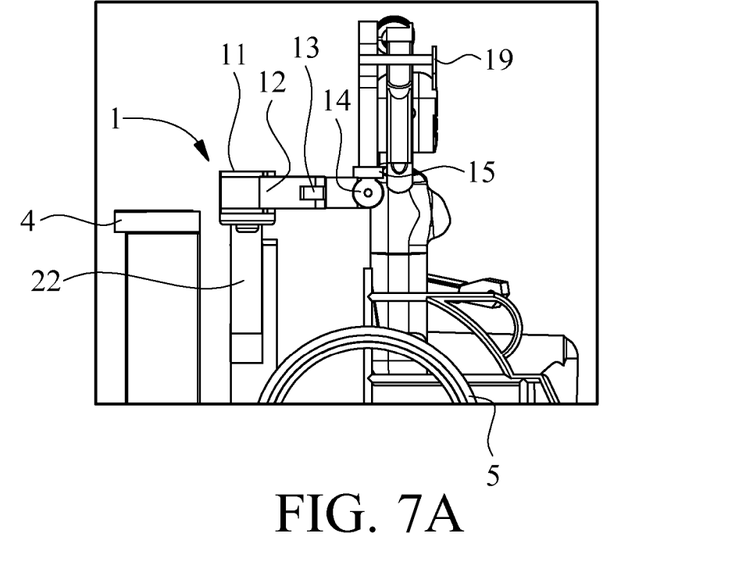
FIGS. 7A and 7B are also fragmentary side view and fragmentary front 45-degree perspective view, respectively, showing the second way of using the rehabilitation and training apparatus of the present invention to help a patient in performing the rehabilitation exercise of shoulder flexion; wherein the patient's upper arm is maintained at the rotation angle of 90-degree internal rotation while the patient's shoulder joint has been upward turned to a 180-degree position.
Figure 7B:
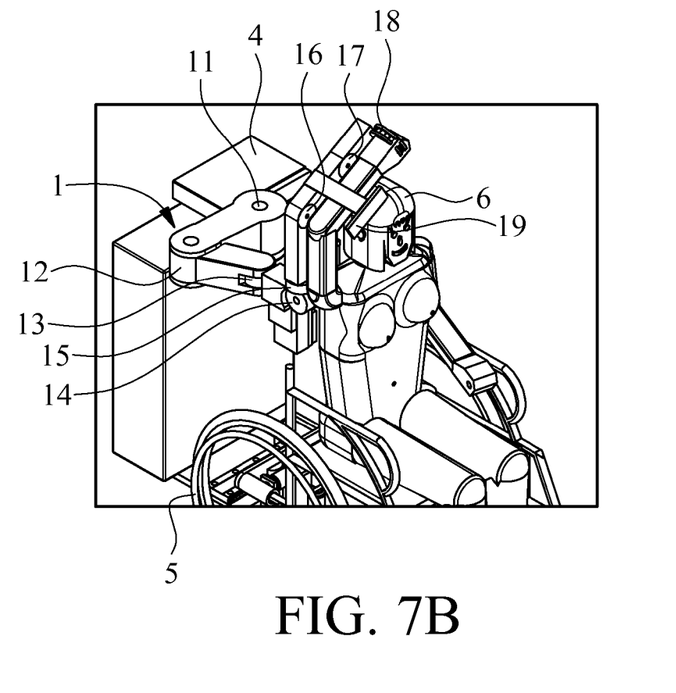

To help the patient 6 to perform the rehabilitation exercises of shoulder flexion and extension, first cause the fourth arm segment 14 to rotate about the fourth rotational axis A4, so that the fifth to eighth arm segments 15-18 are actuated. FIGS. 4A and 4B as well as FIGS. 5A and 5B show a first way of using the rehabilitation and training apparatus of the present invention to help the patient in performing the rehabilitation exercise of shoulder flexion. As can be seen in FIGS. 4A and 4B, the patient's upper arm is initially at a rotation angle of zero degree and the patient's shoulder joint is initially at a zero-degree position. Then, as can be seen in FIGS. 5A and 5B, the patient's upper arm is maintained at the rotation angle of zero degree while the patient's shoulder joint is upward turned to a 180-degree position. As shown, through control of the first, the second and the third arm segment 11, 12, 13 and adjustment of the vertical linear sliding rail 22, the fourth arm segment 14 can be brought to one lateral side of the patient's body and substantially located as high as the patient's shoulder. Then, the fourth arm segment 14 helps the patient 6 to upward turn the patient's shoulder joint to a 180-degree position, so that the patient's arm is moved into a vertically raised state to complete the exercise of shoulder flexion. FIGS. 6A and 6B as well as FIGS. 7A and 7B show a second way of using the rehabilitation and training apparatus of the present invention to help a patient in performing the rehabilitation exercise of shoulder flexion. As can be seen in FIGS. 6A and 6B, the patient's upper arm is initially at a rotation angle of 90-degree internal rotation and the patient's shoulder joint is initially at a zero-degree position. Then, as can be seen in FIGS. 7A and 7B, the patient's upper arm is maintained at the rotation angle of 90-degree internal rotation while the patient's shoulder joint is upward turned to a 180-degree position. As shown, in the process of raising the patient's shoulder joint, through control of the first, the second and the third arm segment 11, 12, 13 and adjustment of the vertical linear sliding rail 22, the fourth arm segment 14 can be moved and adjusted from a position above the patient's shoulder, as shown in FIGS. 6A and 6B, to a position behind the patient's shoulder, as shown in FIGS. 7A and 7B. Then, the fourth arm segment 14 located behind the patient's shoulder can help the patient 6 to upward turn the patient's shoulder joint to a 180-degree position, so that the patient's arm is moved into a vertically raised state to complete the exercise of shoulder flexion. The multi-axis robotic arm 1 of the present invention can help the patient to raise the shoulder joint within a largest possible movement range that can be reached by a normal person. That is, with the help of the present invention, the patient can raise his or her arm or upper arm to a vertical position close to his or her ear without being restricted by the structure of the multi-axis robotic arm 1.

Figure 8A:
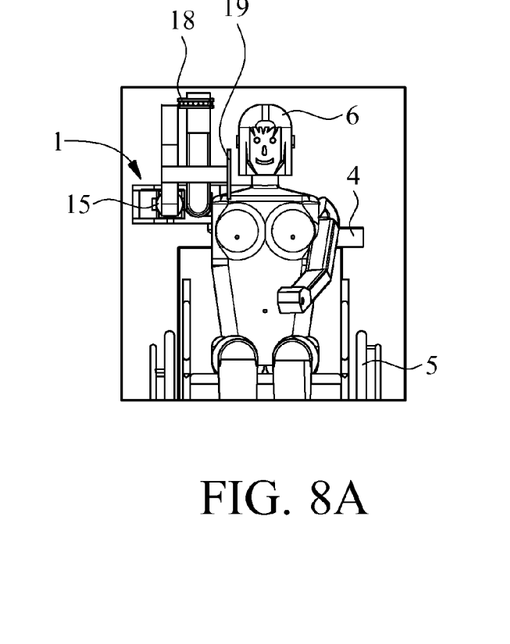
FIGS. 8A and 8B are fragmentary front view and fragmentary front 45-degree perspective view, respectively, showing the use of the rehabilitation and training apparatus of the present invention to help a patient in performing the rehabilitation exercise of shoulder external rotation and internal rotation; wherein the patient's upper arm is initially in a vertical position.
Figure 8B:
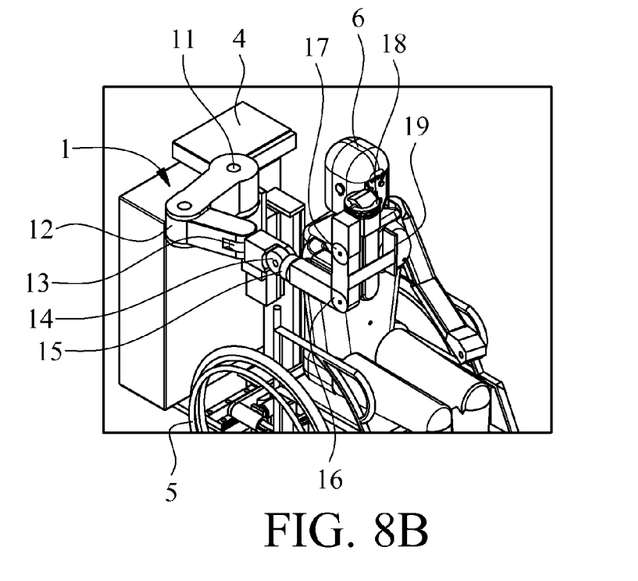
Figure 9A:
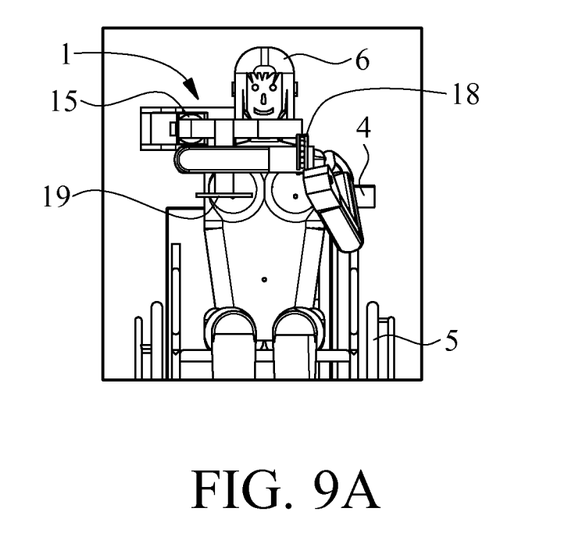
FIGS. 9A and 9B are also fragmentary front view and fragmentary front 45-degree perspective view, respectively, showing the use of the rehabilitation and training apparatus of the present invention to help a patient in performing the rehabilitation exercise of shoulder external rotation and internal rotation; wherein the patient's upper arm is now in a position after a 90-degree internal rotation.
Figure 9B:
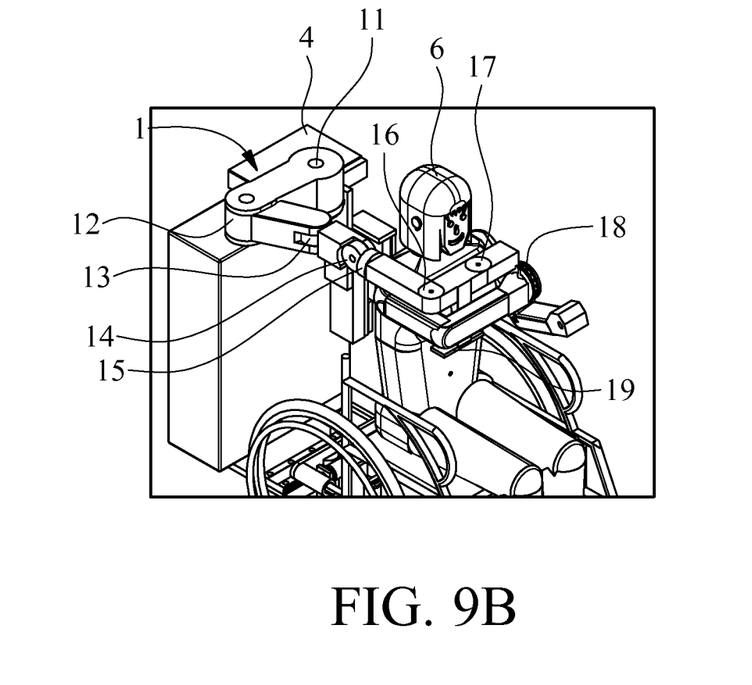

To help the patient 6 to perform the rehabilitation exercises of shoulder external rotation and internal rotation, first cause the fifth arm segment 15 to rotate about the fifth rotational axis A5, so that the sixth to eighth arm segments 16-18 are actuated. FIGS. 8A and 8B as well as FIGS. 9A and 9B show the use of the rehabilitation and training apparatus of the present invention to help a patient in performing the rehabilitation exercise of shoulder internal rotation. As can be seen in FIGS. 8A and 8B, which are front view and front 45-degree perspective view, respectively, the patient's upper arm is initially in a vertical position. Meanwhile, as can be seen in FIGS. 9A and 9B, which are front view and front 45-degree perspective view, respectively, the patient's upper arm is now in a position after a 90-degree internal rotation. In the process of shoulder internal rotation, the patient's shoulder and upper arm are maintained at a fixed position. The vertical linear sliding rail 22 is vertically moved upward, and the first arm segment 11, the second arm segment 12 and the third arm segment 13 are moved at the same time. And then, the fifth arm segment 15 is caused to rotate about the fifth rotational axis A5, so that the patient 6 can perform the rehabilitation exercise of shoulder internal rotation while the patient's shoulder and upper arm are maintained at the fixed position.

To help the patient 6 to perform the rehabilitation exercises of elbow flexion and extension or the exercise of raising forearm, first cause the sixth arm segment 16 to rotate about the sixth rotational axis A6, so that the seventh arm segment 17 and the eighth arm segment 18 are actuated.

To help the patient 6 to perform the rehabilitation exercises of wrist flexion and extension, first cause the seventh arm segment 17 to rotate about the seventh rotational axis A7, so that the eighth arm segment 18 is actuated.

To help the patient 6 to perform the rehabilitation exercises of wrist pronation and supination, first bring the eighth arm segment 18 to a position corresponding to the patient's palm and then cause the fifth arm segment 15 to rotate about the fifth rotational axis A5 while the first arm segment 11, the second arm segment 12, the third arm segment 13 and the vertical linear sliding rail 22 are correspondingly moved at the same time to a proper position.

Accordingly, the rehabilitation and training apparatus of the present invention can be used to assist a patient 6 in performing upper or lower limb rehabilitation exercises. That is, by cooperative operation of the multi-axis robotic arm 1 and the control system 4 of the present invention, it is able to perform various and complete rehabilitation exercises or training movements that are suitable for human upper or lower limbs. These rehabilitation exercises or training movements include, for example, abduction and adduction, external rotation and internal rotation, as well as extension and flexion of different regions of upper or lower limbs.

Further, to adapt for different patients 6 who have different armor leg lengths, the rehabilitation and training apparatus of the present invention is provided on the multi-axis robotic arm 1 at positions corresponding to human upper arm and forearm (or thigh and shank), i.e. on at least one of the sixth arm segment 16 and the seventh arm segment 17, with at least one adjustor. FIG. 3 shows an upper arm/thigh length adjustor 161 and a forearm/shank length adjustor 171 are mounted on the sixth arm segment 16 and the seventh arm segment 17, respectively, for adjusting relevant links of these arm segments 16, 17 to different lengths according to the patient's upper arm/thigh or forearm/shank length.

In the illustrated embodiment, the multi-axis robotic arm 1 further includes a support member 19, which is arranged at a position corresponding the patient's forearm, i.e. arranged at a position between the sixth arm segment 16 and the seventh arm segment 17. The support member 19 mainly provides a place for supporting or fixing the patient's upper limb or lower limb. In the illustrated embodiment, the patient's upper arm is placed on the support member 19, so that the multi-axis robotic arm 1 can guide the patient's upper limb to do habilitation exercises. The support member 19 can be a handle or a member capable of enclosing the patient's one limb therein. On the other hand, the illustrated multi-axis robotic arm 1 has structural arrangements and operating manners that allow the patient 6 to perform the above-mentioned various rehabilitation exercises simply by supporting or fixing the patient's forearm on the support member 19. It is not necessary to support or fix the patient's upper arm on the multi-axis robotic arm 1. In this manner, it is able to minimize possible discomfort of the patient's skin caused by frictional contact with too many supporting or fixing structures of the rehabilitation and training apparatus during the process of doing rehabilitation exercises.

In the illustrated embodiment, the horizontal linear sliding rail 21 of the position adjustment mechanism 2 is arranged on the movable base 3, and the vertical linear sliding rail 22 of the position adjustment mechanism 2 is connected at one end to the first arm segment 11 of the multi-axis robotic arm 1. The horizontal linear sliding rail 21 and the vertical linear sliding rail 22 enable the multi-axis robotic arm 1 to adapt to the patient's different upper or lower limb positions and the patient doing the exercises in a sitting position. With the two-degree of freedom of the position adjustment mechanism 2, the multi-axis robotic arm 1 can be adjusted to proper operating positions.

In the illustrated embodiment, the movable base 3 further includes a wheelchair fixing unit 31 for immovably holding a wheelchair 5 to the base 3, a platform fixing unit 32 for stably holding the base 3 in place without the risk of swinging, and a set of base casters 33. For a patient who is currently not convenient to walk and must rely on a wheelchair, the nurse needs only to push the wheelchair 5 with the patient 6 sitting thereon to engage it with the wheelchair fixing unit 31, and the patient 6 may start doing a rehabilitation exercise directly on the wheelchair 5. The base casters 33 allow a nurse to easily push the whole rehabilitation and training apparatus to a ward for use when the patient could not move easily.

Figure 10:
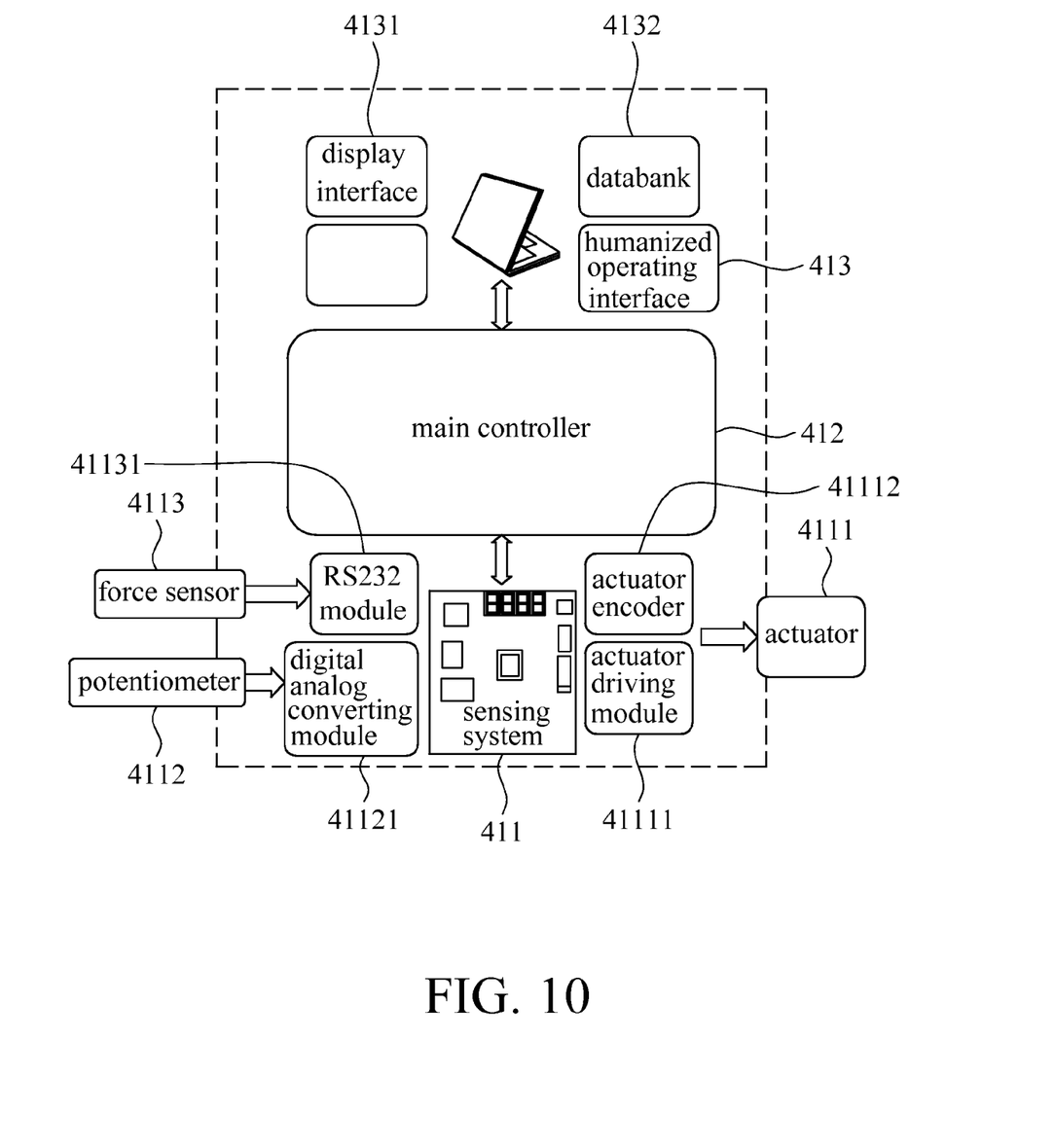
FIG. 10 is a block diagram of a control system of the present invention.

FIG. 10 is a block diagram of the control system 4. The control system 4 is divided into three parts each having a different function, namely, a sensing system 411, a main controller 412, and a humanized operating interface 413.

The sensing system 411 is configured to receive and process the sensed information and send the processed information to the main controller 412 for use as a basis of decision making. Then, the actuators 4111 are driven via an actuator driving module 41111, so that all the arm segments 11 to 18 are moved into their respective specified positions. Meanwhile, the main controller 412 keeps receiving the sensed information, such as position information sent back by an actuator encoder 41112, and converts analog signals indicating the angle information from the potentiometers 4112 into digital signals via a digital analog converting module 41121. The digital signals are then sent to the main controller 412 for analyzing and correcting errors in positions and angles.

During the rehabilitation therapeutic courses, the main controller 412 will utilize a databank 4132 to establish files for some data required by therapists and doctors, and show the data on a display interface 4131 for viewing and using by the doctors and therapists as basis in assessing the effects of rehabilitation.

When the patient's physical condition is improved, the doctors and therapists may select via the humanized operating interface 413 one of three operating modes, namely, an active mode S61, a passive mode S62, and an auxiliary mode S63 (refer to FIG. 11B) for the patient. And, the force sensors 4113 are driven to measure the patient's muscular strength.

The measured information is sent to the main controller 412 via a transmission protocol set by an RS232 module 41131, so that the main controller 412 drives the actuators 4111 via the actuator driving module 41111 to assist the patient 6 in completing the rehabilitation exercises by producing an adequate aiding force or resisting force to the patient.

Figure 11A:
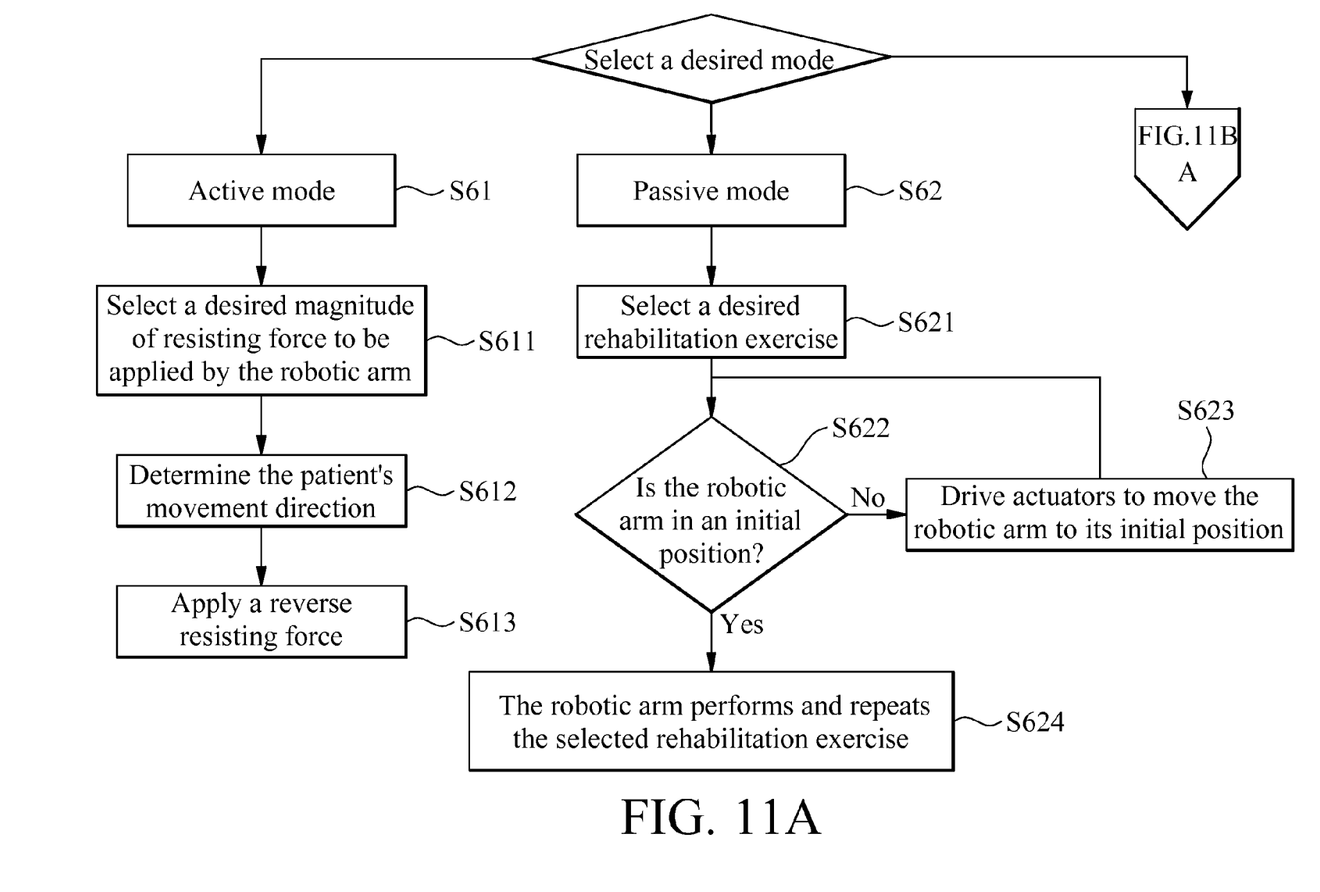
FIGS. 11A and 11B together represent a flowchart showing the steps included in a method of controlling the rehabilitation and training apparatus of the present invention.
Figure 11B:
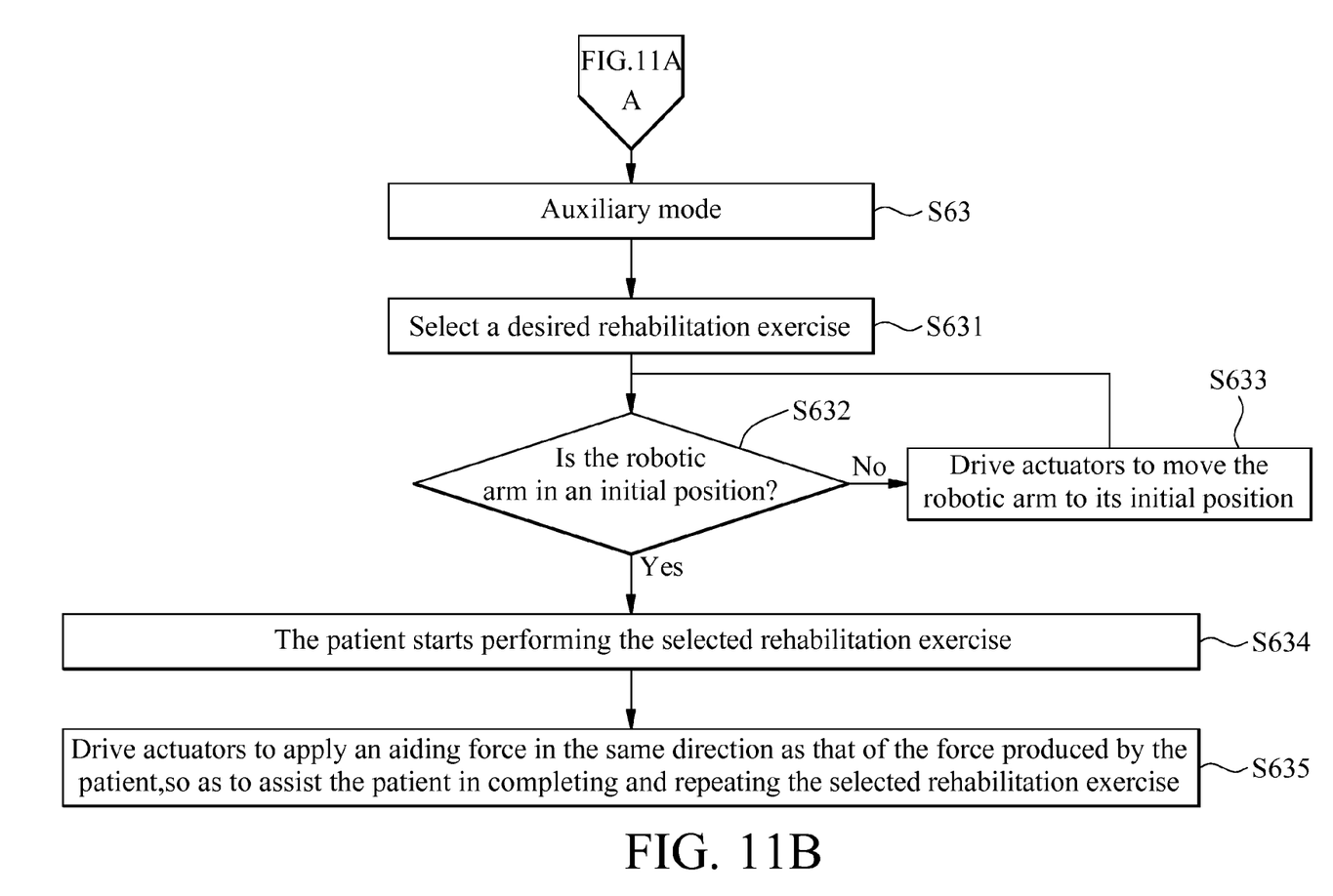

FIGS. 11A and 11B together represent a flowchart showing the steps included in a method of controlling the rehabilitation and training apparatus of the present invention. The above-mentioned active mode S61, passive mode S62, and auxiliary mode S63 will now be described in more details with reference to FIGS. 11A and 11B.

The active mode S61 allows the rehabilitation and training apparatus of the present invention to provide the training function, and is suitable for a patient whose arms meet the condition of producing force by themselves. In the active mode, the patient using the apparatus to do rehabilitation exercises may select according to his or her own physical conditions the magnitude of resisting force to be provided by the robotic arm (S611), just like someone in a gym to adjust the pounds of dumbbell by himself. Then, the main controller 412 receives via the digital analog converting module 41121 the information from the potentiometers 4112, and determines the direction of the patient's movement based on the received information (S612). Thereafter, the main controller 412 drives the actuators 4111 to apply a resisting force in a direction opposite to the patient's movement direction (S613). For example, when the patient produces an upward force, the main controller 412 would integrate the direction of the patient's movement and drive the actuators 4111 to apply a downward resisting force.

The passive mode S62 allows the rehabilitation and training apparatus of the present invention to provide the rehabilitation function suitable for a patient at an early stage of recovery. That is, the patient is currently unable to produce force by himself and requires full aid from the apparatus to achieve the rehabilitation effect. When the apparatus is in the passive mode, a desired rehabilitation exercise for the patient may be selected from the databank 4132 (S621). Information about the selected rehabilitation exercise is sent to the main controller 412 via the RS232 module 41131. Then, the main controller 412 would determine whether the multi-axis robotic arm 1 is in an initial position (S622). If the multi-axis robotic arm 1 is not in the initial position, the main controller 412 would drive the actuators 4111 to move the arm segments 11 to 18 of the multi-axis robotic arm 1 to their respective initial positions (S623). When the multi-axis robotic arm 1 has been returned to its initial position, it would start performing the selected rehabilitation exercise and repeat the same exercise (S624).

The auxiliary mode S63 allows the rehabilitation and training apparatus of the present invention to provide the rehabilitation function suitable for a patient who is able to produce force to some extent but has not fully recovered. When the apparatus is in the auxiliary mode, the patient may select a desired rehabilitation exercise from the databank 4132 (S631). Information about the selected rehabilitation exercise is sent to the main controller 412 via the RS232 module 41131. Then, the main controller 412 would determine whether the multi-axis robotic arm 1 is in an initial position (S632). If the multi-axis robotic arm 1 is not in the initial position, the main controller 412 would drive the actuators 4111 to move the arm segments 11 to 18 of the multi-axis robotic arm 1 to their respective initial positions (S633). When the multi-axis robotic arm 1 has been returned to its initial position, the patient may start performing the selected rehabilitation exercise (S634). The force sensors 4113 would detect the force produced by the patient and send the detected information to the control system 4, so that the control system 4 drives the actuators 4111 to apply an aiding force in the same direction as that of the force produced by the patient to assist the patient in completing and repeating the selected rehabilitation exercise (S635).

The present invention has been described with a preferred embodiment thereof and it is understood that many changes and modifications in the described embodiment can be carried out without departing from the scope and the spirit of the invention that is intended to be limited only by the appended claims.

What is claimed is:

1. A rehabilitation and training apparatus for assisting a patient in performing upper limb rehabilitation exercises, comprising:
   a movable base;
   a position adjustment mechanism being arranged on the movable base and including a vertical linear sliding rail and a horizontal linear sliding rail connected to the vertical linear sliding rail;
   a multi-axis robotic arm, a sequence including:
      a first arm segment being directly connected to the vertical linear sliding rail and rotatable about a first rotational axis;
      a second arm segment being directly connected to the first arm segment and rotatable about a second rotational axis;
      a third arm segment being directly connected to the second arm segment and rotatable about a third rotational axis; and the third rotational axis being parallel to the first rotational axis and the second rotational axis;
      a fourth arm segment being directly connected to the third arm segment and rotatable about a fourth rotational axis, with the fourth rotational axis being always perpendicular to the first, the second and the third rotational axis, with the third rotational axis disposed between the second and fourth rotational axes;
      a fifth arm segment being directly connected to the fourth arm segment and rotatable about a fifth rotational axis; and the fifth rotational axis being always perpendicular to the fourth rotational axis;
      a sixth arm segment being directly connected to the fifth arm segment and rotatable about a sixth rotational axis; and the sixth rotational axis being always perpendicular to the fifth rotational axis;
      a seventh arm segment being directly connected to the sixth arm segment and rotatable about a seventh rotational axis; and the seventh rotational axis being parallel to the sixth rotational axis; and
      an eighth arm segment being directly connected to the seventh arm segment;
   a plurality of potentiometers being arranged on the multi-axis robotic arm for detecting different positions of the first to eight arm segments;
   a plurality of force sensors being arranged on the multi-axis robotic arm for detecting forces applied to at least one of the first to eighth arm segments;
   a plurality of actuators being arranged on the multi-axis robotic arm for driving the first to eighth arm segments to move; and
   a control system being electrically connected to the potentiometers and the force sensors for receiving and computing information detected and sent by the potentiometers and force sensors, and driving the actuators based on the computed information to control the multi-axis robotic arm; and the control system being able to record and analyze a rehabilitation data of the patient.

2. The rehabilitation and training apparatus as claimed in claim 1, wherein at least one of the sixth arm segment and the seventh arm segment further includes at least one adjustor for adjusting at least one of a distance between the fifth arm segment and the sixth arm segment and a distance between the sixth arm segment and the seventh arm segment.

3. The rehabilitation and training apparatus as claimed in claim 1, wherein the multi-axis robotic arm further includes at least one support member for supporting and moving the patient's upper limb.

4. The rehabilitation and training apparatus as claimed in claim 2, wherein the multi-axis robotic arm further includes at least one support member for supporting and moving the patient's upper limb.

5. The rehabilitation and training apparatus as claimed in claim 3, wherein the support member is selected from the group consisting of a handle for gripping and a member capable of enclosing the patient's upper limb.

6. The rehabilitation and training apparatus as claimed in claim 4, wherein the support member is selected from the group consisting of a handle for gripping and a member capable of enclosing the patient's upper limb.

7. The rehabilitation and training apparatus as claimed in claim 1, wherein the first rotational axis, the second rotational axis and the third rotational axis are extended in a vertical direction.

8. The rehabilitation and training apparatus as claimed in claim 1, wherein the movable base further includes a wheelchair fixing unit for engaging with a wheelchair, allowing a patient to do rehabilitation exercises while sitting on the wheelchair.

9. The rehabilitation and training apparatus as claimed in claim 2, wherein the movable base further includes a wheelchair fixing unit for engaging with a wheelchair, allowing a patient to do rehabilitation exercises while sitting on the wheelchair.

10. The rehabilitation and training apparatus as claimed in claim 3, wherein the movable base further include a wheelchair fixing unit for engaging with a wheelchair, allowing a patient to do rehabilitation exercises while sitting on the wheelchair.

11. The rehabilitation and training apparatus as claimed in claim 4, wherein the movable base further include a wheelchair fixing unit for engaging with a wheelchair, allowing a patient to do rehabilitation exercises while sitting on the wheelchair.

12. The rehabilitation and training apparatus as claimed in claim 5, wherein the movable base further include a wheelchair fixing unit for engaging with a wheelchair, allowing a patient to do rehabilitation exercises while sitting on the wheelchair.

13. The rehabilitation and training apparatus as claimed in claim 6, wherein the movable base further include a wheelchair fixing unit for engaging with a wheelchair, allowing a patient to do rehabilitation exercises while sitting on the wheelchair.

14. A method of controlling a rehabilitation and training apparatus, comprising the following steps:

providing a rehabilitation and training apparatus according to claim 1;
selecting one of an active mode, a passive mode, and an auxiliary mode from the control system;
selecting a magnitude of resisting force to be applied by the multi-axis robotic arm when the active mode is selected;
the control system receiving information detected and sent by the potentiometers and determining a direction in which a patient moves a limb; and
the control system driving the actuators to apply a reverse resisting force to train the patient's muscular strength.

15. The control method as claimed in claim 14, further comprising the following the steps when the passive mode is selected:
selecting a desired rehabilitation exercise from the control system;
the control system determining whether the multi-axis robotic arm is in an initial position corresponding to the selected rehabilitation exercise; and
the multi-axis robotic arm starting performing and repeating the selected rehabilitation exercise when the multi-axis robotic arm has been returned to the initial position.

16. The control method as claimed in claim 14, further comprising the following the steps when the auxiliary mode is selected:
selecting a desired rehabilitation exercise from the control system;
the control system determining whether the multi-axis robotic arm is in an initial position corresponding to the selected rehabilitation exercise;
the patient starting performing the selected rehabilitation exercise when the multi-axis robotic arm has been returned to the initial position; and
the control system receiving information about a magnitude of force produced by the patient detected and sent by the force sensors and information about a direction of the force produced by the patient detected and sent by the potentiometers, and driving the actuators to apply an aiding force in the same direction as that of the force produced by the patient, so as to help the patient to complete and repeat the selected rehabilitation exercise.

17. The control method as claimed in claim 15, further comprising the following the steps when the auxiliary mode is selected:
selecting a desired rehabilitation exercise from the control system;
the control system determining whether the multi-axis robotic arm is in an initial position corresponding to the selected rehabilitation exercise;
the patient starting performing the selected rehabilitation exercise when the multi-axis robotic arm has been returned to the initial position; and
the control system receiving information about a magnitude of force produced by the patient detected and sent by the force sensors and information about a direction of the force produced by the patient detected and sent by the potentiometers, and driving the actuators to apply an aiding force in the same direction as that of the force produced by the patient, so as to help the patient to complete and repeat the selected rehabilitation exercise.

* * * * *